United States Patent [19]

Shaw et al.

[11] 4,320,437
[45] Mar. 16, 1982

[54] CAPACITOR WITH EDGE COATED ELECTRODE

[75] Inventors: David G. Shaw, Glens Falls; Angelo Yializis, South Glens Falls, both of N.Y.

[73] Assignee: General Electric Company, Hudson Falls, N.Y.

[21] Appl. No.: 161,723

[22] Filed: Jun. 23, 1980

[51] Int. Cl.³ ............................................... H01G 113
[52] U.S. Cl. ................................... 361/303; 361/275; 361/314; 361/323
[58] Field of Search ............... 361/323, 303, 313, 314, 361/275; 174/127, 117 FF, 119 R; 29/25, 42

[56] References Cited

U.S. PATENT DOCUMENTS

| 2,528,596 | 11/1950 | Liechti . | |
|---|---|---|---|
| 2,590,650 | 3/1952 | Robinson | 361/323 X |
| 2,597,429 | 5/1952 | Bailey | 174/127 |
| 3,047,782 | 7/1962 | McCarthy | 174/127 |
| 3,090,895 | 5/1963 | Hall | 361/303 |
| 3,511,680 | 5/1970 | Marcell | 174/117 FF |
| 3,558,803 | 1/1971 | Osborn | 174/119 R |
| 3,665,269 | 5/1972 | Wright | 361/323 |
| 3,857,073 | 12/1974 | Yagitani | 361/323 X |
| 3,911,384 | 10/1975 | Andersson | 174/127 X |

FOREIGN PATENT DOCUMENTS

| 44-8551 | 5/1969 | Japan | 174/117 FF |
|---|---|---|---|
| 44-25410 | 10/1969 | Japan . | |

*Primary Examiner*—Elliot A. Goldberg
*Attorney, Agent, or Firm*—Lichiello, James J.

[57] ABSTRACT

A roll section for an electrical capacitor comprises a wound composite of alternate strips of polypropylene and aluminum foil with narrow bands of a dielectric coating along the longitudinal edges of the aluminum strips. The coated edges may also be folded for optimum results.

8 Claims, 5 Drawing Figures

CAPACITOR WITH EDGE COATED ELECTRODE

BACKGROUND OF THE INVENTION

This invention relates to an improved dielectric, liquid impregnated, wound roll electrical capacitor and more particularly to wound roll capacitors wherein a high dielectric constant polymer coat is utilized on the edges of the electrode foils at the roll ends or edges.

In the production of electrical capacitors, particularly improved power factor correction capacitors utilizing synthetic resin films, principally polypropylene, as the sole dielectric, there have been a number of deterrent electrical problems. These problems relate to the feature that the capacitors are made up of alternating thin strips of electrode foil and synthetic resin film which are wound together very tightly in a roll form. Then, one or more such rolls are tightly fitted into a casing which is filled with a dielectric fluid to impregnate the roll. Because of the tightness of the assembly and the swelling of the resin film by the fluid impregnant, the usual thin layer of a dielectric fluid at the roll edges between an electrode foil and a film strip becomes markedly thinner. A present practice for other reasons is to use a lower dielectric constant fluid in such capacitors, and when this thin layer of fluid is under a very high voltage stress, breakdown and deleterious corona discharge occurs. This condition limits the development of more efficient and effective capacitors.

SUMMARY OF THE INVENTION

It has been discovered that the foregoing problems can be resolved by providing corona suppression means in predetermined positions on the electrode foil edges at the roll ends. The corona suppression means, in the nature of a dielectric coating on a foil edge, provides a capacitor of higher stress carrying characteristics and improved performance.

THE DRAWINGS

This invention will be better understood when taken in connection with the following description and the drawings in which.

DESCRIPTION OF THE INVENTION

Figure 1:
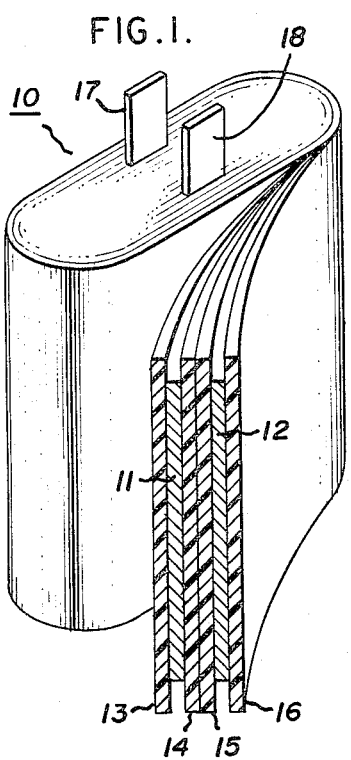
FIG. 1 is an exaggerated cross-sectional illustration of a prior art capacitor roll section to which this invention is most applicable.

Referring now to FIG. 1, there is illustrated a typical capacitor roll 10 to which this invention is directed. Roll 10 comprises a pair of electrode strips 11 and 12 which are usually foils of aluminum or zinc, and alternate dielectric strips 13, 14, 15 and 16. The practice of the present invention is particularly related to the prior art and current commercial usage of a synthetic resin film such as polypropylene film for strips 13, 14, 15 and 16. Strips 11–16 are wound together to form the roll 10 which, as illustrated, has the repeating combination of pairs of electrode strips with intermediate pairs of dielectric strips.

A typical roll 10 may range from about 1.0 inch (2.54 cm) in height to more than about 24.0 inches (61 cm) and may be of a thickness across the smaller dimension ranging from 0.5 inch (1.26 cm) to about 1.0 inches (2.54 cm). Electrode strips 11 and 12 may be from about 0.2 mil (5 u) to about 2.5 mil (6.25 u) thickness and dielectric strips 13–16 range in thickness from about 0.32 mil (8 u) to about 0.60 mil (15 u).

Rolls 10 are usually tightly wound on a circular core member, removed from the core member, and then mechanically compressed or flattened to the illustrated configuration of FIG. 1. During the roll winding process, electrical taps 17 and 18 (FIG. 1) are inserted into roll 10 to make contact with the electrode strips 11 and 12. Thereafter, one or more rolls 10 are placed in a suitable can or casing, a plural roll capacitor being illustrated in FIG. 2.

Figure 2:
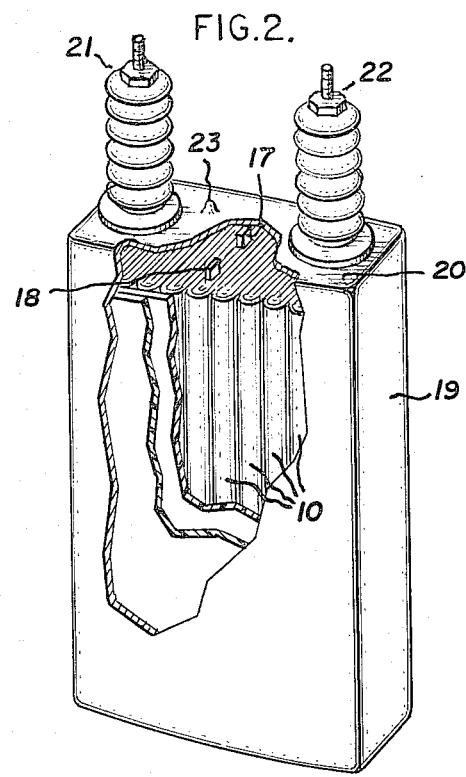
FIG. 2 is an illustration of a roll section of FIG. 1 in a can or casing as a complete capacitor.

Referring now to FIG. 2, there is illustrated a typical power factor correction capacitor such as a 200 KVAR unit to which this invention is most applicable. This unit includes a number of rolls 10 inserted in a metal casing 19 with a cover 20 sealed to the casing 19. Taps 17 and 18 from each roll 10 are connected to the terminals 21 and 22 on the cover 20. Cover 20 also includes an exhaust and fill opening 23. Thereafter, the capacitor of FIG. 2 is vacuum dried and filled through opening 23, under elevated temperatures and under vacuum, with a dielectric fluid which is caused to essentially completely impregnate the roll 10 and its resin film dielectric. Such an impregnation process is more fully described and claimed in U.S. Pat. No. 3,363,156, Cox, assigned to the same assignee as the present invention.

Recently it has become the practice to utilize polypropylene film as the sole dielectric between electrode foils and to also use an impregnant fluid having a lower dielectric constant, for example, between 2.0 and 3.0 as compared to the dielectric constant of above about 5.0 which was associated with prior used chlorinated diphenyl fluids. It has been discovered that this combination in many instances provides a corona discharge intensity level and quantity, together with degradation of the dielectric system at the foil edges which has greatly increased, to the detriment of the capacitor.

Alternatively, roll edge corona is described in this invention as that corona which may occur at the usual threshold levels but whose intensity increases more rapidly than in prior combinations. Under some test conditions where very high corona discharge voltages must be sustained for relatively longer periods of time, corona discharge becomes a limiting factor. Foil edge corona limits further developments of increasing the otherwise available electrical stress capabilities of the capacitor, because the stresses at the inner parts of the roll may be safely increased and the stresses of the foil edge cannot be increased because of corona discharge.

Electrode foil strips are usually slit from a larger sheet and the foil edges while seemingly smooth, contain a great number of irregularities and sharp edge projections distributed along the longitudinal edges of the foil length. All point projections or irregularities from a theoretical smooth edge are points of very high voltage stress concentration in an electrical field. Some of these sharp edges abrade and penetrate the softer synthetic resin dielectric and reduce the dielectric strength of the dielectric at that point. Corona discharge at that point leads to a rapid deterioration of the dielectric. In other locations along the foil, with higher dielectric constant fluids surrounding the foil edge more electrical stress was borne by the polypropylene dielectric. With lower dielectric constant fluids more of this stress is carried by the fluid, which begins to break down electrically and chemically. This breakdown with its eroding of the dielectric materials and release of gases rapidly increases the breakdown of the dielectric system while abetting further corona, and the cycle leads to an early demise of the capacitor.

Treatment of electrode foil edges to reduce corona discharge has been known in the art. U.S. Pat. No. 2,528,596 discloses the use of a polymer coating on the foil edge to greatly thicken the dielectric at the foil edge and to thereby reduce the electrical field strength between electrodes at that point. However at the very high voltage stresses presently used, e.g., more than 1000 volts per mil (0.0025 cm) thickness in the dielectric material between adjacent foils, and often approaching 1500 volts per mil, corona formation is easily produced on foil edge irregularities and discontinuities independent of the spacing of an adjacent foil. Lower dielectric constant fluids absorb a greater amount of electrical stress than do higher dielectric constant fluids. Accordingly, the lower dielectric constant fluid which is present next to the foil begins to break down and contributes to increased corona discharge. This continues until the capacitor is irreparably damaged. It is known to smooth the foil edges by careful cutting practices or to fold the foil edge longitudinally as in Japanese Pat. No. 44-25410. Both methods, while beneficial to some degree in the elimination of major discontinuities, fail to provide an effective corona discharge barrier or consistent containment of corona. Only slight amelioration of foil edge corona discharge provides significant improvements in the stress carrying capabilities of the capacitor.

It has been discovered that a very thin coating of a high dielectric constant and high alternating current (AC) dielectric strength material on the foil edge, in combination with a lower dielectric constant liquid, provides a markedly improved capacitor with regard to corona discharge suppression at its roll edge. In fact an even more significant improvement is noted when a folded foil edge is coated as will be described with respect to FIGS. 3 and 5.

Figure 3:
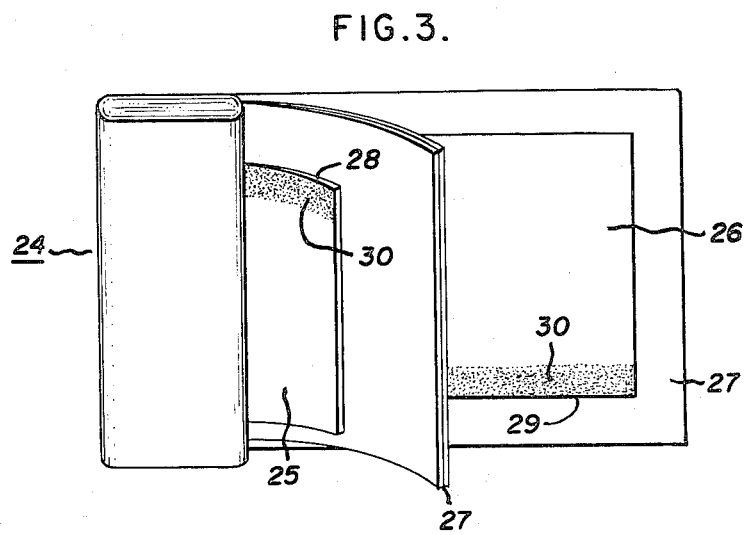
FIG. 3 illustrates a coating on one foil edge of each foil in the roll of FIG. 1 where the foils are in staggered relationship.

Referring now to FIG. 3 there is illustrated a capacitor roll 24 similar to the capacitor roll 10 of FIG. 1 and to which this invention is applied. In FIG. 3 roll 24 is shown in a partly unwound condition illustrating a pair of spaced aluminum foil electrodes 25 and 26 and intermediate strips 27 of a resin film dielectric. In the usual practices of capacitor assembly, it is extremely difficult, if not impossible, to maintain precise alignment or registry of the foil edges so that there are many exposed foil edges where stresses are higher than in other areas because of the nature of misaligned electrodes and electric fields. For smaller or lower voltage capacitors this small misalignment causes no major problems as it does for high stress capacitors. In the present high stress capacitor of FIG. 2 for example, a preferred practice is to offset one foil, in this case foil 25 with respect to the other foil. This practice concentrates on the edge corona problem at what is referred to as the lower or buried edge 28 of the foil 25, and edge 29 of foil 26. In the practice of this invention both sides of the longitudinal edges 28 and 29 are coated with a very thin layer or bands 30 of a high dielectric constant material, preferably a polymer material. The unique purpose served by this coating means is to replace the very thin layer of a low dielectric constant fluid which is found adjacent a foil edge in an impregnated capacitor with a thin or even thinner layer of a polymer having an equal to or a higher dielectric constant and dielectric strength than the liquid and preferably also higher than that of the film dielectric. The liquid layer has less dielectric breakdown strength than a solid and is the weak link in the edge corona system. Secondly, the coatings 30 will smooth or cover edge irregularities to reduce physical damage of adjacent dielectrics and to eliminate the smallest amounts of gas that can be trapped in the projection of these irregularities in adjacent dielectrics. The polymer coating 30 becomes a high dielectric constant impregnating medium for the foil, filling up voids and covering discontinuities, and is applicable to folded foils as well as plain foils, unexpectedly showing even more favorable results for the former.

The following examples are indicative of the practice of this invention:

EXAMPLE I

In order to determine the advantages gained by the use of this invention in capacitors, two sets of capacitors were constructed which were as identical as practicable in all major respects except that one set entitled "coated" included capacitors having one foil which for convenience was totally coated or covered with a polymer. The polymer was polyvinyl butyral between 0.06 (1.5 u) and 0.20 (5.0 u) thickness with an average about 0.10 (2.5 u) mil. The foil was dipped in a solution and allowed to air dry about 12 hours. The following electrical test results are noted:

| Corona Start Voltage | |
|---|---|
| Control | 2.3 kv |
| Coated | 4.5 kv |

As can be seen from the above data there is a significant difference in the corona values of the comparative capacitors. This difference arises solely from the coating on the foil edges. This coating is a solid and continuous film essentially without breaks or perforations and clings tightly to the foil. It smooths out discontinuities and asperities and provides a solid dielectric barrier adjacent the electrode and between the electrode and between the electrode and the lower dielectric constant fluid. The coating may cover the total foil and thus be a part only of the solid dielectric system or it may be solely an edge coating. Most corona problems are associated with the foil edges. Where the preferred edge coating is employed the foil start and ending transverse edges must also be coated or otherwise suitably protected.

In the practice of this invention, edges of each foil may be coated for excellent results. However, it may only be necessary for one foil to have both its edges coated to provide a dramatic improvement over the absence of any coating. Where a single foil is to be coated the foil should be a lower or buried foil as noted in FIG. 4.

Figure 4:
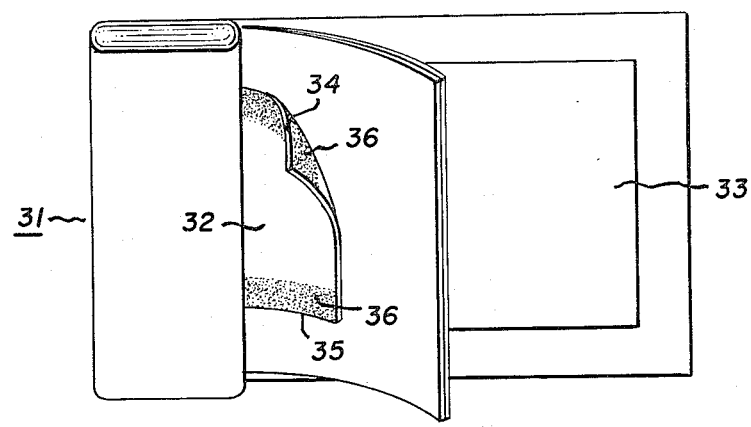
FIG. 4 illustrates a modification of the roll of FIG. 3 wherein both edges of a narrow or buried foil are coated.

Referring now to FIG. 4, the capacitor roll 31 is similar to the roll 24 of FIG. 3. However, one foil 32 denoted the inner foil is narrower than the outer foil 33 and is concentric therewith. This means that both longitudinal edges 34 and 35 of foil 32 are spaced within the longitudinal edges of the outer foil. Because of this spacing of foil edges, the lower or buried foil edges 34 and 35 are the edges which have the highest stress and therefore are the primary areas for treatment. In one practice of this invention both sides of the edges 34 and 35 of the buried foil are coated with a band or layer 36. In edge coating, as illustrated it is only necessary to coat the extreme foil edge for major corona protection. However, extensive coating is not deleterious. It has been found that a coating extending inwardly at least about 0.25 (0.62 cm) inch from the outer edge is satisfactory. Some edge coating techiques as a matter of convenience operate more effectively with wider application areas, a practice which would not be detrimental in the present instance if the total surface were covered.

As described, edge coating provides a dramatic improvement in raising the corona threshold in a given capacitor structure. The coating of this invention is not primarily utilized to thicken the dielectric at the foil edge and thereby reduce the field strength. The coating is used to raise the threshold level of corona or suppress corona not only in the existing field strength but also to be effective in the presence of very high field strengths. Ordinarily a coated edge adds, perhaps, up to about 15% increase in dielectric thickness and this may result in an increase in corona voltages of at least 15%. On the basis of thickness above the coating of this invention, the increase in ionization voltage is above 15% while the predominate effect is obtained by the practices of this invention which replaces the lower dielectric constant fluid at the foil edge with a higher dielectric constant coating, which in turn is higher than the synthetic resin dielectric system. The primary purpose of the coating of this invention is not to space the foils any further apart, and therefore the coating may be as thin as possible to avoid roll edge thickness.

Figure 5:
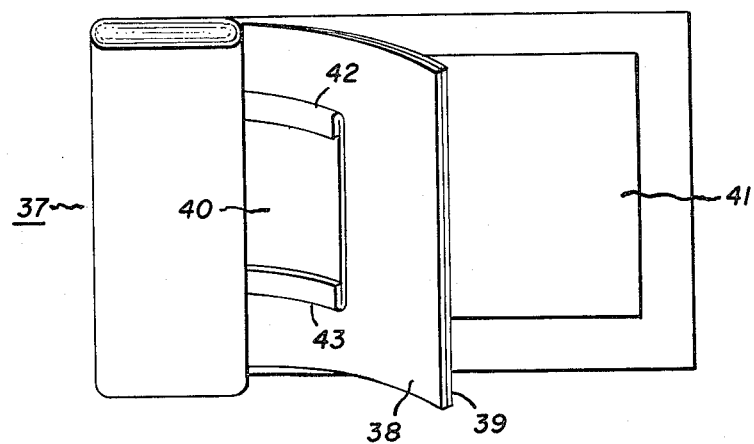
FIG. 5 illustrates a preferred embodiment of this invention of a combined coating/folded foil arrangement.

Maximum corona improvement is obtained in the practice of this invention when the coating is combined with folded foil practices. This practice is best described with respect to FIG. 5. FIG. 5 is an edge view of a capacitor roll 37 similar to the roll 24 of FIG. 4 and showing a pair of dielectric resin strips 38 and 39 between foil strips 40 and 41. As in FIG. 3 the capacitor roll electrode foil may be in registry buried or staggered, but for convenience is shown as a buried foil. The lower or buried edge of foil 40 is mechanically folded over on itself to thus provide smooth and rounded edges 42 and 43. Folding of the foil need only provide about 0.25 in depth or width of folding. Folded foil in and of itself will provide a marked increase in corona discharge levels of a capacitor. It has been discovered however that the coating of this invention with its higher dielectric constant and higher alternating current (AC) dielectric strength than the fluid can considerably improve the folded foil technique. Sometimes the coating of a foil edge does not nullify or accommodate all the sharp edges and some of these sharp edge stress points remain as such in spite of being coated. The folded foil places these sharp edges lower in the foil in areas of average stresses and an immediate benefit is obtained. In one practice of the present invention a foil electrode was coated along one side of one longitudinal edge and the foil was folded over with the coating outside. The coating was an ultraviolet catalyzed epoxide material in liquid form and was applied to the foil edge by rollers. Thereafter the epoxide coated edge was passed through an ultraviolet radiation system for the epoxide to cure to a solid. After curing the epoxide is sufficiently flexible so that the coated edge can then be mechanically folded over on itself with a full coating of epoxide exposed. The epoxide employed was a commercially available epoxide 3,4-epoxy-cyclohexylmethyl-3,4-epoxy-cyclohexane-carboxylate known as Unox 221. Other epoxides may also be employed, another example being 1-epoxyethyl-3-4 epoxycyclohexane.

Several capacitors which were otherwise identical were assembled with different electrode foil configuration for corona comparison and corroboration. Data is given in the following example:

EXAMPLE II

Several operative and essentially identical capacitors were produced in general conformance with the structure of FIG. 1 to provide comparative results with the use of the embodiments of the present invention. These capacitors included spaced electrode foils of 0.22 mil thick aluminum and polypropylene film strips of 60 gauge thickness. Coating materials included an acrylate formulation of 5.9 dielectric constant, an acrylated urethane of 5.1 dielectric constant, and a UV catalyzed epoxide of 3.9 dielectric constant. In all cases the dielectric liquid impregnant was phenyl xylyl ethane (PXE). Plain means a straight or unfolded foil and the absence of any coating. Plain coated is a plain foil with only the edges coated. Folded means a plain foil folded as described, and folded coated means a plain coated foil which has been folded. The average thickness of these coatings was about 0.15 mil (3.75 u). Comparable results are given in the following table. DIV is discharge inception voltage, i.e., corona start voltage, and DEV is discharge extinguishing voltage, i.e., corona extinguishing voltage. These units were rated at 1400 volts and test voltages were 2 to 2¼ times rated voltage.

| | Results | | | |
| --- | --- | --- | --- | --- |
| | DIV (kv) | DEV (kv) | Breakdown Time/Min | Volts AC |
| Plain | 2.6 | 1.9 | 5.6 | 3200 |
| Plain Coated | 3.0 | 2.3 | 6.4 | 3200 |
| Folded | 3.1 | 2.4 | 2.5 | 3500 |
| Folded Coated | 4.0 | 2.9 | >28.0 | 3500 |

As can be seen from the above values, a plain coated foil is about the equivalent of a plain folded. However, the folded coated is greatly superior to all others with an increase in expected life of at least 10 times. This translates to the economics of a capacitor indicating that less material can be more highly stressed, or that a given capacitor may have very superior high voltage withstand characteristics. There were no failures of those capacitors with coated edges. The plain foil capacitors failed at the foil edges.

A number of different coatings may be employed in connection with this invention including both resin and nonresin dielectric materials. Preferably the coating is a solid polymer on the foil by deposition including ultraviolet deposition, plasma coating or glow discharge coating. In connection with the latter process, very thin polymer coatings, below about 1000 angstroms, may be deposited in such a manner to provide very uniform, highly cross-linked polymer layers that are solvent resistant and highly impermeable to fluids. The coating may be deposited from a monomer gas in the presence of a glow discharge. By varying the monomer, the surface chemistry can be controlled. Such coatings display excellent adhesion characteristics to aluminum foil. The described glow coating may also be used to coat entire strips of foil for barrier purposes. The coating is pinhole free and exceptionally durable because of the cross-linking which takes place in this process. For aluminum foil electrodes, the glow discharge coating could improve wettability and provide a barrier to gas voids. The coating of this invention is required to be continuous along a foil edge and on both sides to a significant depth. Any pinhole or discontinuity of this coating or layer will provide corona problem areas. Other coating processes include polymerization, wiping and dipping, extrusion and also chemical, electrochemical and mechanical processes. Included in such coatings are polycarbonates, polyesters, polythiolenes and polyethers. The coating may also be an inorganic coating, for example, a thin aluminum oxide coating generated by an oxidizing process or some other inorganic layer formed by an evaporation, sputtering or other suitable process.

The coating of this invention should have a dielectric constant equal to or higher than that of the fluid and solid dielectric. The coating itself is not a part of the ordinary solid dielectric system or the capacitor. Its primary function is as an edge treatment to smooth and cover irregularities found in slit foil edges, and to displace lower dielectric constant fluids from the high stress foil edges.

The advantages gained in the practice of this invention provide a more improved capacitor of wider application, longer life and a more economical capacitor. For example, coated folded foil electrodes raise the onset of corona voltage to such high levels that the voltage rating of the capacitor can be greatly increased. This means that an increment of the voltage rating is supported by the addition of the coating. Alternatively, the design stress on the solid dielectric can be increased between about 20 to 40% for increased capacitance, or the capacitor can be made smaller.

The coating of this invention may be modified to fit particular needs of corona control. For example, the coating occurs at maximum corona sites. Further, the coating or parts of it may be made electrically semiconductive by filling the polymer with conductive or semiconductive particles such as carbon or may be deposited in a semiconducting form, to the extent that stresses may be graded. Furthermore, the coating should be as thin and continuously flat as possible to avoid excess thickness of the roll at its edges. A typical thickness may be about 0.05 to about 0.1 mil thick (0.12 u to 0.25 u) although thickness up to about 5 u are usable.

The capacitor to which this invention is primarily directed is a high voltage alternating current power factor correction capacitor. The voltage ratings of such capacitors range from 660 volts to as much as 25,000 volts. This capacitor utilizes only a synthetic resin film as the dielectric and the film is electrically stressed above about 1000 volts per mil thickness (40 volts/u). These capacitors are rated in kilovars (KVAR) from about 5 to about 3 to 400. The dielectric constant of the impregnating fluid is equivalent to that of the synthetic resin film or slightly higher. For example, the dielectric constant of the polypropylene film is about 2.2 and that of the impregnating liquid is about 2.75, while that of one coating is about 3. It is this positive gradation in the described direction which is important to the preferred capacitor of this invention. A dielectric constant equivalent to that of the resin film dielectric would also be appropriate. Dielectric constants lower than that of the resin film are usable but with decreasing advantages.

In the kind of power capacitor thus described, measured values of about 4000 volts for corona discharge have been consistently achieved, thus indicating a factual basis for increasing the working stress in the capacitor. The high level of corona discharge indicates that the corona intensity and resultant dielectric degradation are also markedly reduced for capacitors that are not exposed to such high voltages.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. An electrical capacitor of the high voltage power factor correction type comprising in combination
    (a) a casing
    (b) at least one capacitor roll section in said casing
    (c) said roll section comprising a pair of spaced thin aluminum electrode foil strips and an intermediate dielectric strip all wound in roll form
    (d) and a dielectric liquid of a predetermined dielectric constant in said casing and impregnating said capacitor roll section.
    (e) the said dielectric strip consisting solely of one or more synthetic resin strips of a dielectric constant below about 3
    (f) said dielectric fluid having a dielectric constant below about 3
    (g) at least one of said electrode foils having a narrow, thin band of a solid dielectric polymer material thereon which covers the edge on both sides thereof and being an essentially smooth unbroken and continuous layer
    (h) the thickness of said polymer being in the range of 0.06 mil (1.5 u) to 0.2 mil (5 u).

2. The invention as recited in claim 1 wherein said dielectric strip has a dielectric constant and dielectric strength higher than that of the liquid.

3. The invention as recited in claim 1 wherein the polymer is a cured polymer.

4. The invention as recited in claim 1 wherein the dielectric coating has a dielectric constant high than that of the fluid or dielectric strip.

5. The invention as recited in claim 1 wherein both longitudinal edges of one foil are coated.

6. The invention as recited in claim 5 wherein both said coated longitudinal edges are buried edges.

7. The invention as recited in claim 5 wherein one longitudinal edge on each foil is coated and said edges are buried edges.

8. The invention as recited in claim 1 wherein the said one edge having the said narrow band of coating is an edge folded in U shape, and the coating is on the outside only of the U shape.

* * * * *